United States Patent
McArdle et al.

(10) Patent No.: US 7,949,690 B2
(45) Date of Patent: May 24, 2011

(54) PROJECT STRUCTURE

(75) Inventors: Paul Joseph McArdle, Bow, NH (US);
Chad Steven Ames, Auburn, NH (US);
Lang Sheng Yun, Bedford, NH (US);
Scott Anthony Arvin, New Boston, NH (US)

(73) Assignee: Autodesk, Inc., San Rafael, CA (US)

( * ) Notice: Subject to any disclaimer, the term of this patent is extended or adjusted under 35 U.S.C. 154(b) by 561 days.

(21) Appl. No.: 10/656,020

(22) Filed: Sep. 5, 2003

(65) Prior Publication Data

US 2004/0049739 A1 Mar. 11, 2004

Related U.S. Application Data

(60) Provisional application No. 60/408,716, filed on Sep. 6, 2002.

(51) Int. Cl.
G06F 12/00 (2006.01)
G06F 17/30 (2006.01)
(52) U.S. Cl. ......... 707/821; 707/823; 707/828; 707/829
(58) Field of Classification Search .................. 707/100
See application file for complete search history.

(56) References Cited

U.S. PATENT DOCUMENTS

| | | | | |
|---|---|---|---|---|
| 6,076,105 A | * | 6/2000 | Wolff et al. | 709/223 |
| 6,304,272 B1 | * | 10/2001 | Schanel et al. | 345/676 |
| 6,393,437 B1 | * | 5/2002 | Zinda et al. | 707/201 |
| 6,591,278 B1 | * | 7/2003 | Ernst | 707/104.1 |
| 6,836,752 B2 | * | 12/2004 | Atasoy | 703/1 |
| 6,850,946 B1 | * | 2/2005 | Rappaport et al. | 707/101 |
| 2002/0035408 A1 | * | 3/2002 | Smith | 700/97 |
| 2002/0052862 A1 | * | 5/2002 | Scott et al. | 707/1 |
| 2002/0077939 A1 | * | 6/2002 | Nicastro et al. | 705/29 |
| 2002/0083082 A1 | * | 6/2002 | Fujieda | 707/203 |
| 2002/0129001 A1 | * | 9/2002 | Levkoff et al. | 707/1 |
| 2002/0191219 A1 | * | 12/2002 | Bondy et al. | 358/1.18 |
| 2003/0160825 A1 | * | 8/2003 | Weber | 345/769 |
| 2003/0225710 A1 | * | 12/2003 | Arneson et al. | 705/400 |
| 2004/0024623 A1 | * | 2/2004 | Ciscon et al. | 705/7 |
| 2004/0024624 A1 | * | 2/2004 | Ciscon et al. | 705/7 |
| 2004/0225958 A1 | * | 11/2004 | Halpert et al. | 715/513 |

* cited by examiner

*Primary Examiner* — Jay A Morrison
(74) *Attorney, Agent, or Firm* — Gates & Cooper LLP

(57) ABSTRACT

A method, apparatus, and article of manufacture provide the ability to define a project in a computer graphics program. A project file is defined with general information regarding the project. A folder structure for the project is defined where one or more project drawing files are organized into various folders by drawing file type. A companion file for each project drawing file is defined with information to link each project drawing file to the project.

30 Claims, 7 Drawing Sheets

PROJECT STRUCTURE

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

U.S. patent application Ser. No. 60/408,716, filed on Sep. 6, 2002, by Paul Joseph McArdle, Chad Steven Ames, Lang Sheng Yun, Scott Anthony Arvin, and Chris C. Yanchar, entitled "MODEL MANAGEMENT".

BACKGROUND OF THE INVENTION

1. Field of the Invention

The present invention relates generally to architectural and engineering projects and to Extensible Markup Language (XML), and in particular, to a method, apparatus, and article of manufacture for organizing and managing architectural projects with supporting XML documents.

2. Description of the Related Art

The use of Computer Aided Design (CAD) application programs is well known in the art. CAD application programs are often expensive, complex, and difficult to learn how to use. In this regard, CAD drawings often have many components that a user may desire to separately control and manage. However, prior art methods for organizing and managing components of a drawing remain complex and difficult. Further, prior art techniques fail to take advantage of documents defined by document definition languages (e.g., XML) as part of this organizational and management process. The disadvantages of the prior art may be better understood by describing prior art drawing file structures and document definition languages.

Drawing Programs

As described above, CAD applications are often used to create drawings used in the architectural, engineering, and construction (AEC) industry. The drawings are often defined by a collection (referred to as objects) of one or more graphical elements, such as lines, circles, polylines, text, or dimensions. For example, a collection of various lines may make up a door or window object. CAD programs may treat each object as a single element for creation, manipulation, and modification. Some CAD programs may also provide objects that are special entities with predefined behaviors and display characteristics.

Information relating to an object may be entered and defined in one or more properties of the object. For example, users may have the capability to enter information about the style, dimensions, location, schedule data, and/or other important characteristics of an object.

To view a drawing, different views or layouts may be created. The views provide different ways to work on and plot a drawing/model at the various stages in the design process.

While the prior art provides a limited structure for drawings, the prior art lacks the ability to easily manipulate and organize drawings and objects.

Document Definition Languages

Document definition languages define how a document or information is to be displayed (e.g., in a web browser). Sets of rules, referred to as schemas, may provide for a particular structure for information. For example, an address schema may comprise constraints and limitations as to the order and sequence of elements and datatypes that define an address.

To enable the interpretation and display of information in a particular format, document definition languages and standard programming languages are utilized to define a document. For example, hypertext markup language (HTML) is widely used to define web pages. However, HTML utilizes a predefined set of "tags" to describe elements on the web page. As a result, extensible markup language (XML) has become and is becoming more widely used on the internet. XML is more flexible than HTML and allows tags to be defined by the developer of the web page. Thus, tags for virtually any data items such as product, sales representative, and amount due, can be used for specific applications, allowing web pages to function like database records.

Thus, a schema is a model for describing the structure of information. An XML schema describes a model for a whole class of documents. The model describes the possible arrangement of tags and text in a valid document. A schema may also be viewed as an agreement on a common vocabulary for a particular application that involves exchanging documents.

While XML is increasingly utilized for web-based documents on the Internet, XML has not been frequently applied to the computer-aided design industry. In this regard, XML has not been utilized to manage and organize projects, drawings, or objects.

SUMMARY OF THE INVENTION

One or more embodiments of the invention provide for the concept and use of a project in a computer graphics program. The overall framework for the project is stored in a shared XML file that contains general project information (e.g., name, number, description, level and model division information).

Project files may be organized into various types (e.g., sheet, model view, construct, or element). The file organization is based upon a combination of location within a project folder structure and a companion XML file for each drawing file that identifies the type and properties of the file.

Sheets represent printed/plotted documents and may contain model views. Model views (automatically) assemble appropriate constructs to represent a select portion of the building based upon selected level(s), wing(s), and construct categories. Further, model views may contain constructs.

Constructs uniquely identify the geometry and (property set) data for a specific level/wing and category of a constructed building. Further, constructs may contain elements. Elements describe a set of geometry that may be repeated indiscriminately throughout a building information model.

In addition to the project structure described herein, user definable categories and values for miscellaneous project information may also be allowed. Such categories and values may be stored in one or more XML files of a project.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide support for a project in a computer drawing program. The overall framework for the project is stored in a shared XML file that contains general project information (e.g., name, number, description, level, and model division information). Project drawing files may be organized into various types (e.g., sheet, model, view, construct, or element). The file organization is based upon a combination of location within a project folder structure and a companion XML file for each drawing file that identifies the type and properties of the file.

Hardware Environment

Figure 1:
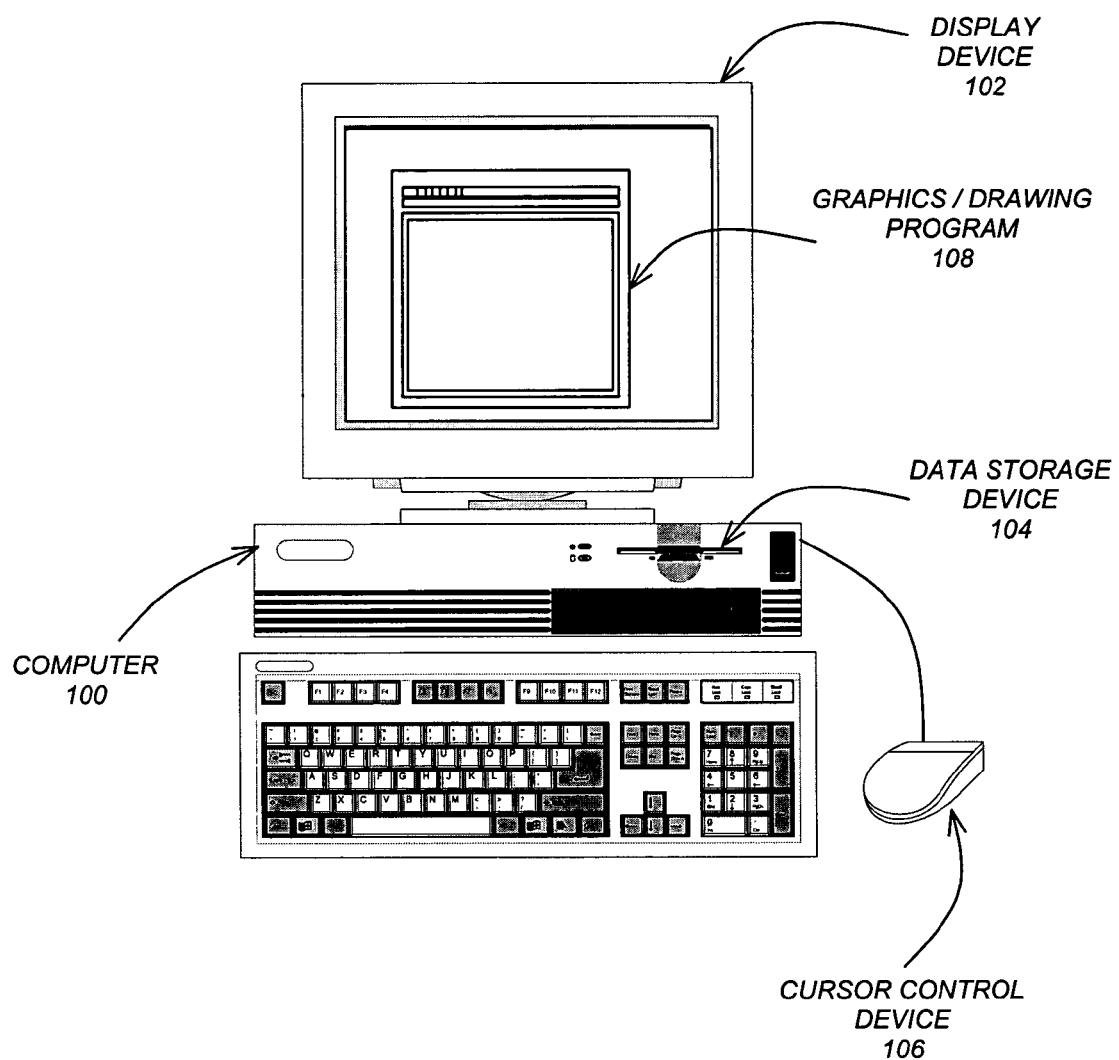
FIG. 1 is an exemplary hardware environment used to implement one or more embodiments of the invention.

FIG. 1 is an exemplary hardware environment used to implement one or more embodiments of the invention. Embodiments of the invention are typically implemented using a computer 100, which generally includes a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented graphics program 108 (e.g., a computer-aided design [CAD] program), wherein the graphics program 108 is represented by a window displayed on the display device 102. Generally, the graphics program 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Software Embodiments

Figure 2:
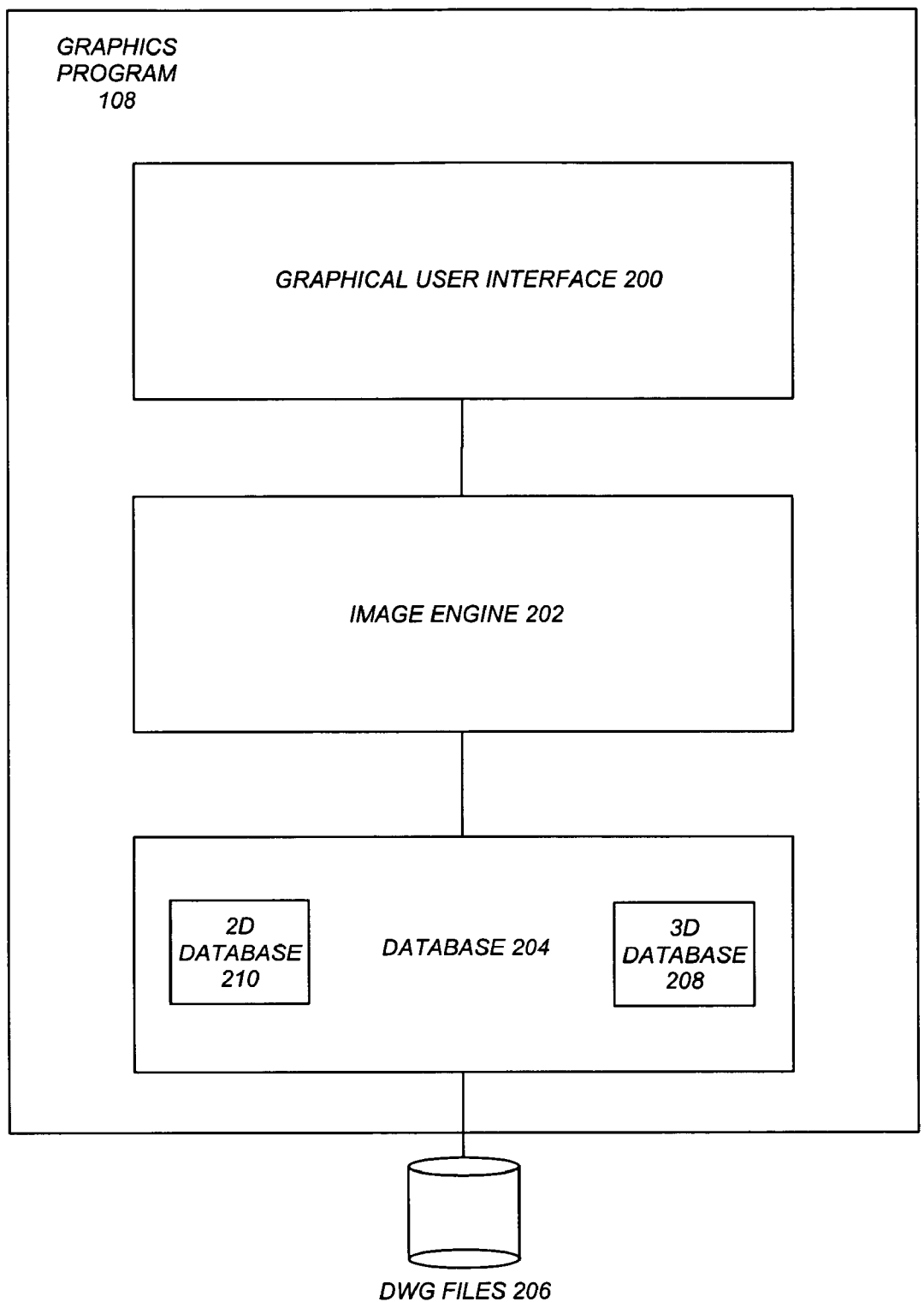
FIG. 2 is a block diagram that illustrates the components of a graphics program in accordance with one or more embodiments of the invention.

FIG. 2 is a block diagram that illustrates the components of the graphics program 108 in accordance with one or more embodiments of the invention. There are three main components to the graphics program 108, including: a Graphical User Interface (GUI) 200, an Image Engine (IME) 202, and a DataBase (DB) 204 for storing objects in Drawing (DWG) files 206.

The Graphical User Interface 200 displays information to the operator and provides the functionality for the operator's interaction with the graphics program 108.

The Image Engine 202 processes the DWG files 206 and delivers the resulting graphics to the monitor 102 for display. In one or more embodiments, the Image Engine 202 provides a complete application programming interface (API) that allows other computer programs to interface to the graphics program 108 as needed.

The Database 204 is comprised of two separate types of databases: (1) a 3D database 208 known as the "3D world space" that stores 3D information; and (2) one or more 2D databases 210 known as the "2D view ports" that stores 2D information derived from the 3D information.

Object List

Figure 3:
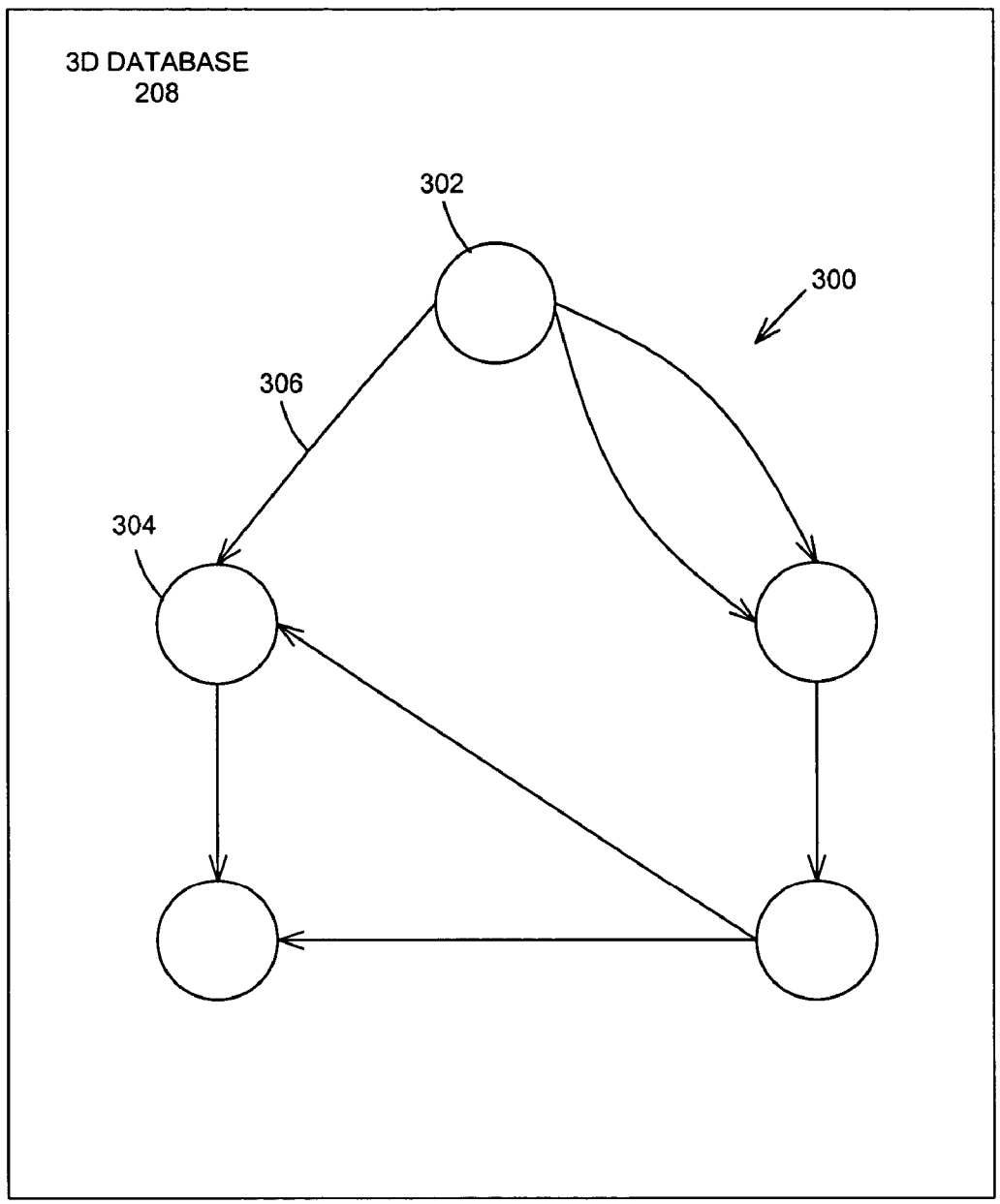
FIG. 3 is a block diagram that illustrates the structure of an object list in accordance with one or more embodiments of the invention.

FIG. 3 is a block diagram that illustrates the structure of an object list 300 maintained by the 3D databases 208 in accordance with one or more embodiments of the invention. The object list 300 is usually comprised of a doubly-linked list having a list head 302 and one or more objects 304 interconnected by edges 306, although other structures may be used as well. There may be any number of different object lists 300 maintained by the 3D databases 208. Moreover, an object 304 may be a member of multiple object lists 300 in the 3D databases 208.

Project Structure

Figure 4A:
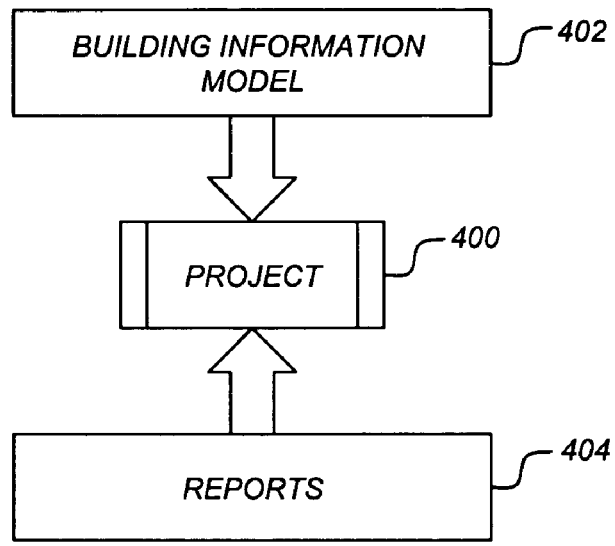
FIG. 4A illustrates the concept of a project in accordance with one or more embodiments of the invention.
Figure 4B:
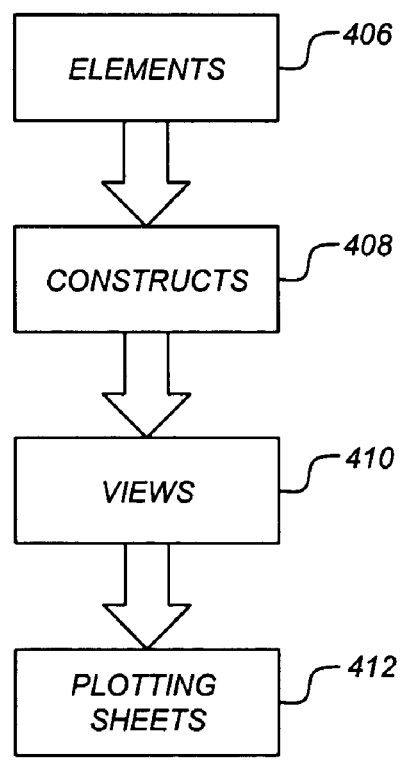
FIG. 4B further illustrates the components of project in accordance with one or more embodiments of the invention.

In the AEC industry, various parties may undertake to build and complete a project. One or more embodiments of the information provide for the organization and maintenance of information for such projects. In this regard, building information models are organized into projects. FIG. 4A illustrates the concept of a project 400 that is composed of two parts, a building information model 402 and reports 404 generated from the model 402. FIG. 4B further illustrates the components of project 400. As illustrated in FIG. 4B, the building information model 402 is composed of elements 406 and constructs 408, while reports 404 consist of views 410 and plotting sheets 412. Within a project 400, elements 406 are referenced into constructs 408, constructs 408 are referenced into views 410, and views 410 are referenced into plotting sheets 412.

Figure 4C:
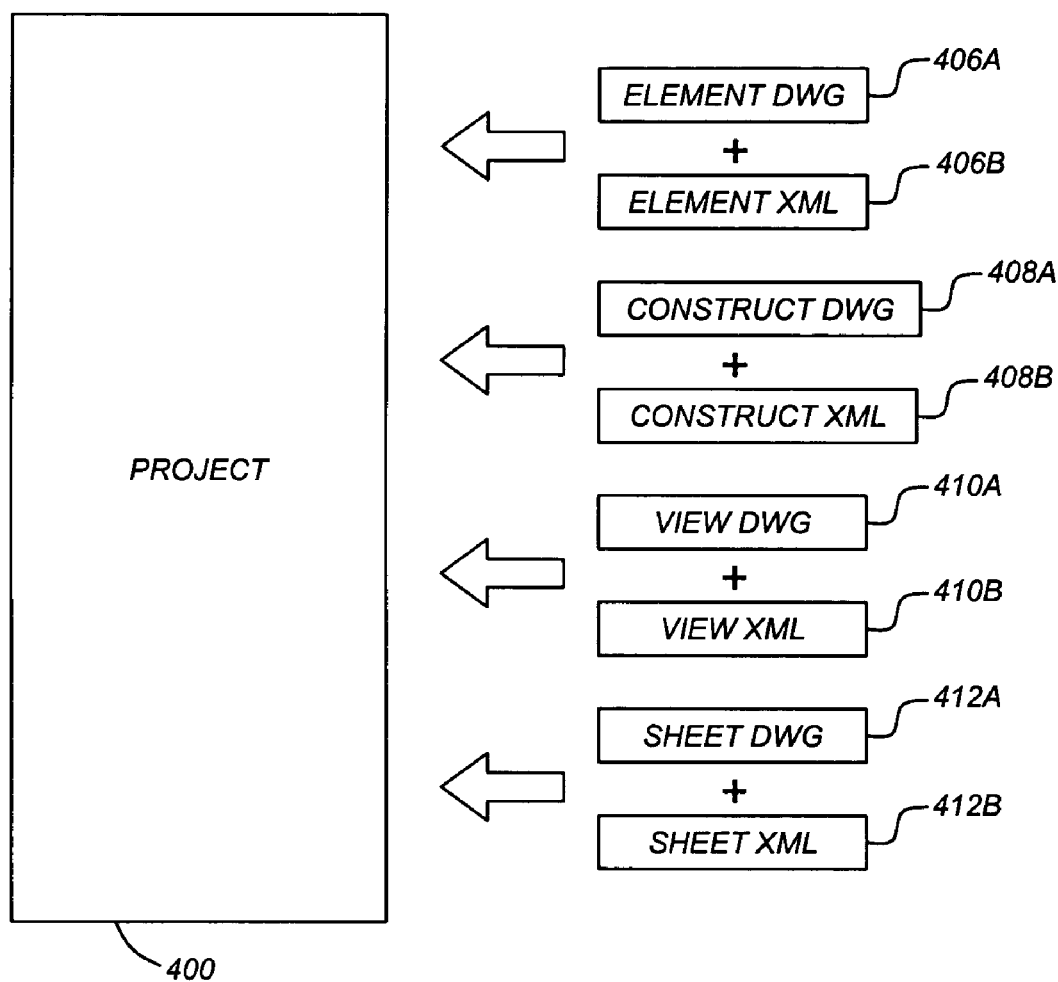
FIG. 4C illustrates an XML structure for a project in accordance with one or more embodiments of the invention.

A project 400 has an underlying XML structure. FIG. 4C illustrates such an XML structure for a project 400. For each drawing file (e.g., DWG files 406A, 408A, 410A, and 412A) created within a project 400 (e.g., a door drawing or a structural drawing), an accompanying XML file (e.g., 406B, 408B, 410B, and 412B) is created. For example, for each element drawing file (DWG file) 406A, construct file 408A, view file 410A, and plotting sheet file 412A, an accompanying XML file 406B-412B respectively is created. The XML files 406B-412B contain project 400 relevant information (e.g., level and division information). Any drawing file 406A-412A created within a project 400 may be used outside of the project 400, because the drawing file 406A-412A itself does not contain project 400 relevant information.

As described above, the XML files 406B-412B may provide basic project information such as level information and/or model division information. A level represents a horizontal division of the building analogous to floors. Levels may contain elevation and (floor-to-floor) height information. Model division information (also referred to as wing) represents an arbitrary vertical division of the building. One purpose of model divisions is to limit the duplication of data, to support multi-user collaboration and to manage file size/performance on large projects 400.

To more easily access, maintain, and modify the various components of a project 400, the project 400 may be organized into a file and directory structure. As part of the directory structure, embodiments of the invention may provide a project 400 file (referred to as an APJ file) that represents the highest level of the project 400. The APJ file contains general information like the project name, number, level and division information, default templates for new elements 406, constructs 408, views 410, and sheets 412. The APJ may also contain a user-configurable detail sheet in which a user may place additional information (e.g., contractor information or legal details). Typically, the APJ may be set up once during the lifetime of the project 400, and details may only change when necessary. In addition, the APJ file is a well-formed XML document that may be opened in an XML editor for editing.

Within the folder structure, project 400 drawing files 406A-412A may be organized into various types (e.g., sheet 412, model view 410, construct 408, or element 406). The file organization is based upon a combination of location within the project folder structure and a companion XML file 406B-412B for each drawing file 406A-412A that identifies the type and properties of the file 406A-412A. Accordingly, a directory structure for each project 400 may include folders for each type of drawing file 406A-412A. The XML files 406B-412B provide the information used to create the directory structure and link each drawing file 406A-412A to the project 400.

Figure 5:
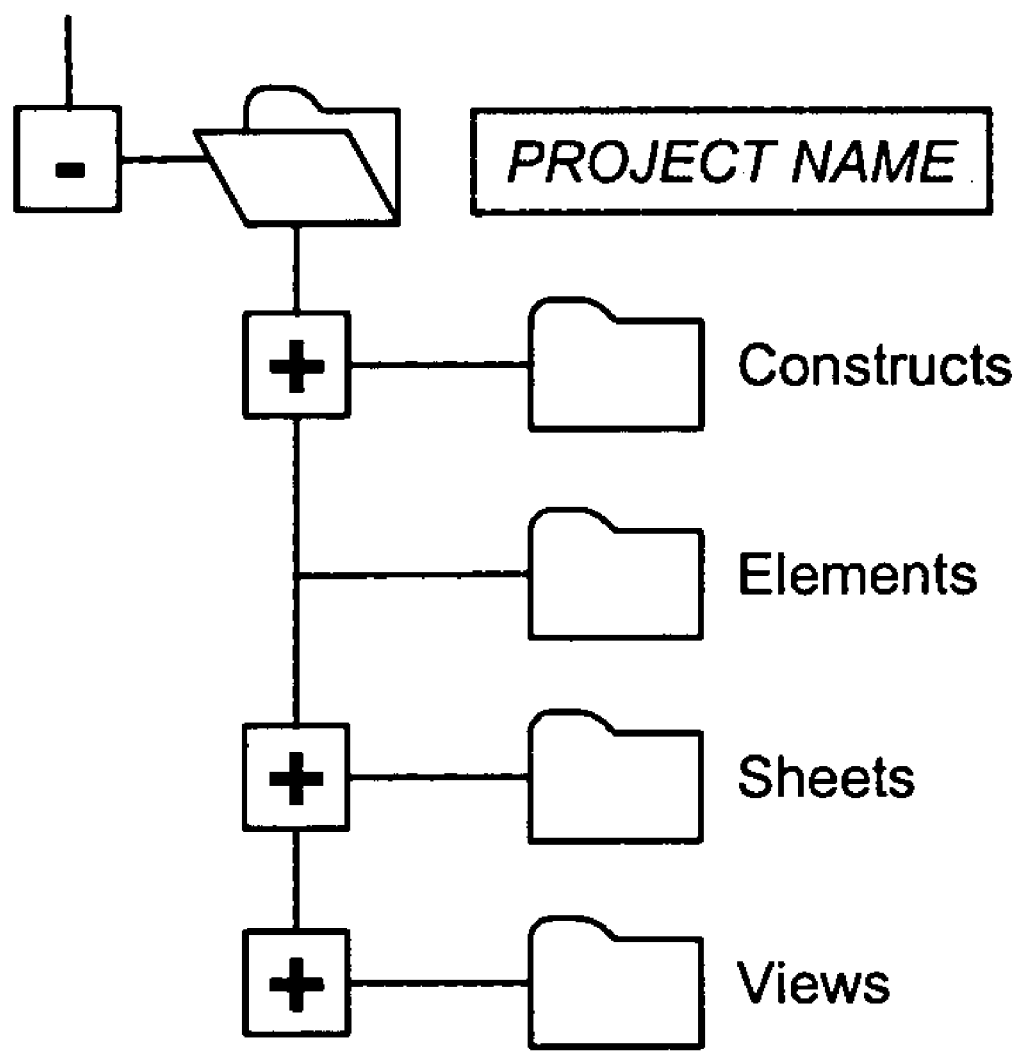
FIG. 5 illustrates a default category structure in accordance with one or more embodiments of the invention.

As described above, the various categories within a project 400 are represented by file folders. For example, a default category structure may be created as illustrated in FIG. 5. The Project Name category is a name that the user has assigned to the project. Within each project 400, there are folders for each of the various file types (i.e., elements 406, constructs 408, views 410, and sheets 412). Subcategories within each of the folders may also be created.

Elements

Elements 406 provide a set of geometry that may be repeated (discriminatory or indiscriminately) throughout a building information model 402. Accordingly, elements 406 are for pieces of a building that may be repeated multiple times within a building. For example, an element 406 may be used to create a repeating design object like a desk/chair combination to be used for a number of cubicles in an office building.

An element 406 is a generic building block for multiple use. The element 406 may know nothing about which level or division it is placed on. Such knowledge may be determined by the construct 408 that the element 406 is referenced into. If a bathroom layout is created as an element 406, the layout may be used on the second floor of the west wing just as well as on the first floor of the east wing. To place the element 406 on a specific floor and wing, the element 406 may be referenced into a construct.

Elements 406 may also be viewed as simple external reference files. Since individual instances of an external reference can be annotated, specific instances of the same element 406 may be used and annotated differently depending on its position.

As described above, an element 406 may be created in a drawing file 406A. Since the drawing file 406A is part of the project 400, an XML file 406B with the same name may also be created. The XML file 406B contains information to connect the drawing file 406A to the project 400.

In addition, an element file 406A may be categorized into one or more valid pre-defined or user-defined categories that may persist. The categories may provide multiple levels of subcategories or subcategory trees. Subcategories may represent components of a user's workflow. For example, subcategories may be created by discipline, by phase, by view type (working, presentation, sections, rendering, etc.), by sheet type (floor plans, ceiling plans, elevations, etc.), or by any other system the user finds helpful.

For example, the uppermost categories may be sheets 412, model views 410, constructs 408, and elements 406 as illustrated in FIG. 5. These categories may contain subcategories for each discipline (e.g., architecture, structural, electrical, etc.). The subcategories may also contain further subcategories for type (e.g., plans, elevations, etc.). The directory structure below a root project 400 directory (as illustrated in FIG. 5) would reflect this categorization.

Constructs

Constructs 408 uniquely identify the geometry and (property set) data for a specific level/wing and category of a constructed building. In other words, a construct 408 represents a set of objects that can be assigned within the building model 402 at the granularity of one per building. A construct 408 may also be viewed as an external reference file with some special behavior in the building model 402. In this regard, a construct 408 may be used to group elements 406 and may maintain a list of portions/regions (i.e., a location within a building model 402 identified by a unique level and model division) to which it is assigned. A construct 408 may be referenced only once per portion and only once per level.

Typical constructs 408 may include curtain wall, shell, second floor core, etc. A construct 408 may have one to two behaviors in the building model 402—unique and spanning. A unique construct 408 is only assigned to one region of the building model 402. A spanning construct 408 spans geometry across more than one region of the building model 402. In this regard, spanning constructs 408 (e.g., curtain walls) may be assigned to multiple levels and divisions. For example, the first level of a building project may consist of an exterior shell construct 408, a first level core construct 408, and a first-level interior partitions construct 408. Thus, a construct 408 may span geometry across multiple portions. Constructs 408 may also be "pushed" into portions of the building model 402 and be placed automatically.

In addition to the above, constructs 408 may contain drawing objects (e.g., walls and doors), external references to elements 406, or a combination of both. For example, a first-level core construct 408 may contain the core walls directly drawn into the construct 408 and an elevator element 406 inserted as an external reference.

Views

Once the structure of the building information model 402 is defined and constructs 408 are assigned to levels and divisions, a user may begin creating reports of the data. A view 410 automatically references/assembles appropriate constructs 408 to present a specific view of the building project 400. To create a view 410, a user may first decide what portion/region of the building the user desires to look at and the type of view to generate. For example, a user may select a level(s), wing(s), and/or construct 408 categories. In this regard, a user may create a first floor reflected ceiling plan or a second floor-framing plan. A user may also create a composite view of all floors in the building.

Views 410 automatically reference the appropriate constructs 408 according to the constructs' location within the building. For example, to create a floor plan of the west wing of the second floor, a user may create a view 410 that references all constructs 408 assigned to the second floor and the west wing. This may also include a curtain wall spanning the first through fifth floors. A user may reference additional constructs 408 that do not lie on that floor but which the user desires to see in the view 410, such as a building outline or grid.

Thus, a model view 410 is a drawing file containing a subset of the building model 402 and default viewing parameters. A model view 410 has knowledge of its included portions/regions and has the ability to query for a list of relevant constructs 408 based on categorization and portion/region assignments. A model view 410 is intended to aid in transferring building model data into a construction sheet 412 format.

A model view 410 may be described as a saved partial construct 408 query. The construct 408 classification folders included in the query are saved. Additionally, the included regions and individually specified constructs 408 may also be saved as part of the query. The intent is to facilitate generation of certain "types" of drawings such as demo plans, construction plans, reflected ceiling plans, exterior elevations, etc. The included classifications of constructs 408 for a type of drawing will remain the same, but the included regions will change (i.e., the first floor reflected ceiling plan and the second floor reflected ceiling plan will both include the same construct 408 classifications). The regions will differ to distinguish the first floor from the second floor.

In the view 410, a user may also add project-wide data like annotation, dimensions, and schedule tables. Whether to create the annotation in the view 410 or in a plotting sheet 412 is a decision the user may make based on workflow and individual needs.

Plotting Sheets

Plotting sheets 412 represent printed/plotted documents/drawing sheets of a project 400. Accordingly, plotting sheets 412 are used to plot plans of a building project 400. The plotting sheet 412 references/contains views 410 and may be stored in a drawing (i.e., DWG) file. When a view 410 is dragged onto a layout in a sheet 412, the view 410 is referenced into model space. A viewport is created on the layout large enough to fit the view 410 at the zoom specified by the view 410. The viewport is zoomed to match the scale specified by the view 410 and has the display configuration assigned as specified by the view 410. The viewport may also have a layer snapshot applied as specified by the view 410.

In the plotting sheet 412, a user may add annotation like tags, dimensions, and schedule tables. Whether to create the annotation in the view 410 or in a plotting sheet 412 is a decision a user may make based on workflow and individual needs.

Logical Flow

Figure 6:
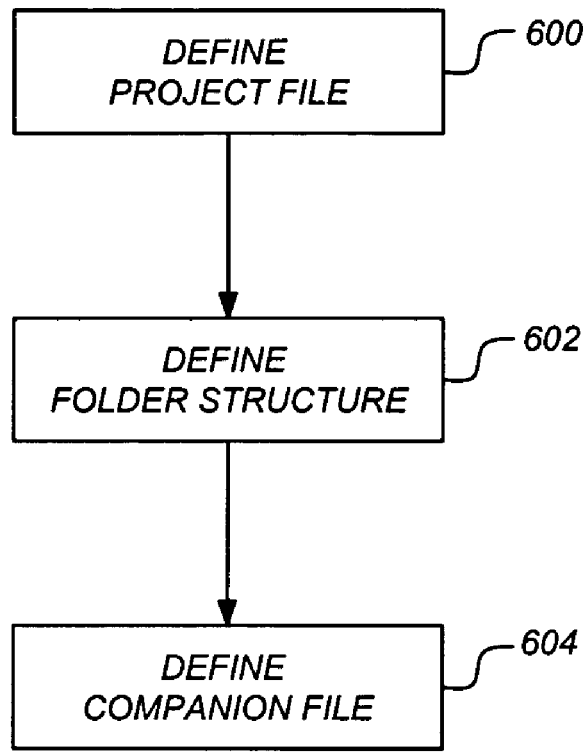
FIG. 6 is a flow chart illustrating the logical flow for defining and organizing a project in accordance with one or more embodiments of the invention.

FIG. 6 is a flow chart illustrating the logical flow for defining and organizing a project 400 in accordance with one or more embodiments of the invention. At step 600, a project file is defined. As described above, the project file contains general information regarding the project 400 and may be a well-defined XML document. For example, the general information may include a project name, a project number, a project level, a project division, and/or default templates for a new element 406, construct 408, view 410, or sheet 412.

At step 602, a folder structure for the project 400 is defined. In the folder structure, the project drawing files are organized into folders by drawing file type. For example, the various folders may include an elements folder for element 406 type drawing files, a constructs folder for construct 408 type drawing files, a views folder for view 410 type drawing files, and/or a sheets folder for sheet 412 type drawing files.

As described above, an element 406 type drawing file may comprise a set of geometry that may be repeated throughout a project 400. A construct 408 type drawing file may comprise an identification of geometry and data for a particular level/wing and category of the project 400 (including one or more elements 406). Further, a view 410 type drawing file may automatically assemble appropriate constructs 408 to represent a portion of a project 400 that has been selected based upon user specified data. Additionally, the sheet 412 type drawing file may include one or more views 410 and represents a printed/plotted document.

At step 604, a companion file for each project drawing file is defined. Each companion file comprises information to link each project drawing file to the project 400. The companion drawing file may be an XML document. In addition, user definable categories may be defined along with values for miscellaneous project information. Such categories and information may then be stored in the companion file.

Assembling of Model Views Through Spatial Querying

Once a project structure has been established, users and developers may desire the ability to easily assemble, access, and maintain a project 400. Accordingly, the spatial space of an architectural construction may be divided into a matrix (i.e., a spatial matrix) comprised of levels (vertical) and model divisions (horizontal). For example, a building with three (3) divisions and three (3) levels may be a 3×3 matrix.

The matrix of levels and divisions may then act as labels to help uniquely identify the building information model. For example, a construct 408 in a building may be named "First Floor—West Wing." Accordingly, architectural constructs 408 may be tagged for their spatial occupancy with cells of the spatial matrix. Constructs 408 of any spatial configuration could be represented this way. For example, a construct 408 in level 1 and division 1 and 2, could be represented as (L1, (D1, D2)). Similarly, a spanning construct 408 from level 1 and level 2 can be represented as {(L1, (D1, D2, D3), (L2, (D1, D2, D3))}.

A model view 410 query could then be created by specifying desired view 410 spatial configuration with cells of the spatial matrix. For example, a view 410 of level 1 can be represented as (L1, (D1, D2, D3)). The view 410 could then be assembled by finding all constructs 408 that at least has a cell in common with the model view 410. Additionally, a query could be created for view 410 categorization with the query occurring through folder path and link.

Model Divisions

People may be familiar with the horizontal divisions of a building commonly referred to as levels or floors. One or more embodiments of the invention may utilize model divisions that refer to arbitrary (vertical) divisions of a building. For example, model divisions may be referred to geographically, such as North Wing, South Wing, etc.

Accordingly, a model division represents an arbitrary vertical division of a building. Model division may be used to limit the duplication of data, to support multi-user collaboration, and to manage file size/performance on large projects. Further, model division information may be stored with other shared project 400 data (e.g., in the APJ file).

Current Project Banner

One or more embodiments of the invention may also provide for a project banner. The current project banner displays a project 400 specific image and project 400 specific text. The image and text displayed may be taken from information entered in project worksheets stored with project data (e.g., the APJ file).

Figure 7:
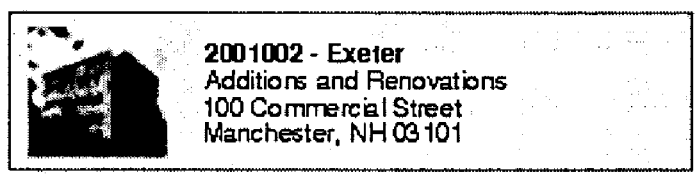
FIG. 7 is an example of a current project banner in accordance with one or more embodiments of the invention.

FIG. 7 is an example of a current project banner in accordance with one or more embodiments of the invention. The current project banner may occupy the upper left region of a drawing and may display an image and text description of the current project 400. Further, the selected image may be scaled, maintaining the image aspect ratio, to fit in the available space.

As described above, the text displayed in the project banner includes information about the current project. For example, the displayed text may include a project name, project number, a user-selected bitmap representing the project, an optional short project description, and/or project location/contractor information.

Project Web Page/Bulletin Board

One or more embodiments of the invention may provide for a project web page/bulletin board. Such a project web page/bulletin is an HTML file or other type of document. Within a navigator/browser that allows access to various project-related information, a uniform resource locator (URL) or other identifier may be used to point to the HTML file (e.g., at a company home page or a project website). The retrieved bulletin board may provide any type of information desired and may appear in a project or Internet browser. Such a project web page/bulletin board may also be similar to the Bulletin Board available on the "Today Page" in AUTOCAD 2000i available from Autodesk, Inc. However, additional functionality may provide the ability to specify a bulletin board per project.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for defining a building/construction project in a computer aided design (CAD) application used in an architectural, engineering, and construction (AEC) industry comprising:
   (a) obtaining a project file in the CAD application comprising general information that is specific to, and is used to identify, the building/construction project;
   (b) creating a directory structure in the CAD application for the building/construction project wherein:
      (i) one or more categories within a project are represented by corresponding file folders in the directory structure;
      (ii) two or more drawing files are organized into the file folders by drawing file type of the one or more drawing files;
      (iii) the two or more drawing files are composed of either a building information model for the project or a report generated from the building information model;
      (iv) the building information model for the project provides and identifies geometry data for the building/construction project;
      (v) the report represents a view or a plotting sheet that includes the geometry data of the building/construction project;
      (vi) the two or more drawing files are organized into the file folders based on the building information model or the report accordingly; and
      (vii) the two or more drawing files do not contain the general information that is specific to and is used to identify the building/construction project;
   (c) obtaining a companion file for each of the two or more drawing files, wherein:
      (i) each companion file corresponds to a single drawing file; and
      (ii) each companion file provides information used to create the directory structure and comprises information to link each corresponding drawing file to the project based on the building information model or the report;
   (d) displaying, in the computer graphics program on a display device, the two or more drawing files in the file folders; and
   (e) performing construction as set forth in the drawing files.

2. The method of claim 1, wherein the general information is selected from a group consisting of:
   a project name for the building/construction project;
   a project number for the building/construction project;
   a project level representing a horizontal division of a building in the building/construction project;
   a project division represents a vertical division of the building in the building/construction project;
   a first default template for a new element comprised of the geometry data;
   a second default template for a new construct comprised of the geometry data;
   a third default template for a new view containing the geometry data; and
   a fourth default template for a new sheet containing the geometry data.

3. The method of claim 1, wherein the each of the two or more drawing files comprises an extensible markup language (XML) document.

4. The method of claim 1, wherein each companion file comprises an extensible markup language (XML) file.

5. The method of claim 1, wherein the file folders comprise:
   an elements folder for element type drawing files within the building information model;
   a constructs folder for construct type drawing files within the building information model;
   a views folder for view type drawing files for the report; and
   a sheets folder for sheet type drawing files for the report.

6. The method of claim 5, wherein the element type drawing file comprises a set of geometry, wherein the set of geometry is repeated one or more times throughout a project.

7. The method of claim 5, wherein the construct type drawing file comprises:
   an identification of geometry and data for a particular level/wing and category of the project; and
   one or more elements.

8. The method of claim 5, wherein the view type drawing file automatically assembles appropriate constructs to represent a portion of the building/construction project that has been selected based upon user specified data.

9. The method of claim 5, wherein the sheet type drawing file comprises one or more views and represents a printed/plotted document of the building/construction project.

10. The method of claim 1, wherein the obtaining a companion file further comprises:
    defining a user definable category and value for project information; and
    storing said user definable category and value in the companion file.

11. An apparatus for defining a building/construction project in a computer aided design (CAD) application used in an architectural, engineering, and construction (AEC) industry comprising:
    (a) a computer having a memory; and
    (b) an application executing on the computer, wherein the application is configured to:
        (i) obtain a project file in the CAD application comprising general information that is specific to and is used to identify the building/construction project;
        (ii) create a directory structure in the CAD application for the building/construction project wherein:
            (1) one or more categories within a project are represented by corresponding file folders in the directory structure;
            (2) two or more drawing files are organized into the file folders by drawing file type of the one or more drawing files;
            (3) the two or more drawing files are composed of either a building information model for the project or a report generated from the building information model;
            (4) the building information model for the project provides and identifies geometry data for the building/construction project;
            (5) the report represents a view or a plotting sheet that includes the geometry data of the building/construction project;
            (6) the two or more drawing files are organized into the file folders based on the building information model or the report accordingly; and
            (7) the two or more drawing files do not contain the general information that is specific to, and is used to identify, the building/construction project;
        (iii) obtain a companion file for each of the two or more drawing files, wherein:
            (1) each companion file corresponds to a single drawing file; and
            (2) each companion file provides information used to create the directory structure and comprises information to link each corresponding drawing file to the project based on the building information model or the report;
        (iv) display, in the computer graphics program on a display device, the two or more drawing files in the file folders; and
        (v) perform construction as set forth in the drawing files.

12. The apparatus of claim 11, wherein the general information is selected from a group consisting of:
    a project name for the building/construction project;
    a project number for the building/construction project;
    a project level representing a horizontal division of a building in the building/construction project;
    a project division represents a vertical division of the building in the building/construction project;
    a first default template for a new element comprised of the geometry data;
    a second default template for a new construct comprised of the geometry data;
    a third default template for a new view containing the geometry data; and
    a fourth default template for a new sheet containing the geometry data.

13. The apparatus of claim 11, wherein the each of the two or more drawing files comprises an extensible markup language (XML) document.

14. The apparatus of claim 11, wherein each companion file comprises an extensible markup language (XML) file.

15. The apparatus of claim 11, wherein the file folders comprise:
    an elements folder for element type drawing files within the building information model;
    a constructs folder for construct type drawing files within the building information model;
    a views folder for view type drawing files for the report; and
    a sheets folder for sheet type drawing files for the report.

16. The apparatus of claim 15, wherein the element type drawing file comprises a set of geometry, wherein the set of geometry is repeated one or more times throughout a project.

17. The apparatus of claim 15, wherein the construct type drawing file comprises:
    an identification of geometry and data for a particular level/wing and category of the project; and
    one or more elements.

18. The apparatus of claim 15, wherein the view type drawing file automatically assembles appropriate constructs to represent a portion of the building/construction project that has been selected based upon user specified data.

19. The apparatus of claim 15, wherein the sheet type drawing file comprises one or more views and represents a printed/plotted document of the building/construction project.

20. The apparatus of claim 11, wherein the application is configured to obtain the companion file by:
    defining a user definable category and value for project information; and
    storing said user definable category and value in the companion file.

21. An article of manufacture comprising a program storage medium readable by a computer and embodying one or more instructions executable by the computer to perform a method for defining a building/construction project in a computer aided design (CAD) application used in an architectural, engineering, and construction (AEC) industry, the method comprising:
    (a) obtaining a project file in the CAD application comprising general information that is specific to and is used to identify the building/construction project;
    (b) creating a directory structure in the CAD application for the building/construction project wherein:
        (i) one or more categories within a project are represented by corresponding file folders in the directory structure;
        (ii) two or more drawing files are organized into the file folders by drawing file type of the one or more drawing files;
        (iii) the two or more drawing files are composed of either a building information model for the project or a report generated from the building information model;
        (iv) the building information model for the project provides and identifies geometry data for the building/construction project;

(v) the report represents a view or a plotting sheet that includes the geometry data of the building/construction project;

(vi) the two or more drawing files are organized into the file folders based on the building information model or the report accordingly; and (vii) the two or more drawing files do not contain the general information that is specific to and is used to identify the building/construction project;

(c) obtaining a companion file for each of the two or more drawing files, wherein:

(i) each companion file corresponds to a single drawing file; and (ii) each companion file provides information used to create the directory structure and comprises information to link each corresponding drawing file to the project based on the building information model or the report;

(d) displaying, in the computer graphics program on a display device, the two or more drawing files in the file folders; and (e) performing construction as set forth in the drawing files.

22. The article of manufacture of claim 21, wherein the general information is selected from a group consisting of:
a project name for the building/construction project;
a project number for the building/construction project;
a project level representing a horizontal division of a building in the building/construction project;
a project division represents a vertical division of the building in the building/construction project;
a first default template for a new element comprised of the geometry data;
a second default template for a new construct comprised of the geometry data;
a third default template for a new view containing the geometry data; and
a fourth default template for a new sheet containing the geometry data.

23. The article of manufacture of claim 21, wherein the each of the two or more drawing files comprises an extensible markup language (XML) document.

24. The article of manufacture of claim 21, wherein each companion file comprises an extensible markup language (XML) file.

25. The article of manufacture of claim 21, wherein the file folders comprise:
an elements folder for element type drawing files within the building information model;
a constructs folder for construct type drawing files within the building information model;
a views folder for view type drawing files for the report; and
a sheets folder for sheet type drawing files for the report.

26. The article of manufacture of claim 25, wherein the element type drawing file comprises a set of geometry, wherein the set of geometry is repeated one or more times throughout a project.

27. The article of manufacture of claim 25, wherein the construct type drawing file comprises:
an identification of geometry and data for a particular level/wing and category of the project; and
one or more elements.

28. The article of manufacture of claim 25, wherein the view type drawing file automatically assembles appropriate constructs to represent a portion of the building/construction project that has been selected based upon user specified data.

29. The article of manufacture of claim 25, wherein the sheet type drawing file comprises one or more views and represents a printed/plotted document of the building/construction project.

30. The article of manufacture of claim 21, wherein the obtaining a companion file further comprises:
defining a user definable category and value for project information; and
storing said user definable category and value in the companion file.

* * * * *